United States Patent
Weston et al.

(10) Patent No.: US 10,703,170 B2
(45) Date of Patent: Jul. 7, 2020

(54) TIRE SMOKE INDUCTION PREVENTION SYSTEM FOR A MOTOR VEHICLE

(71) Applicant: FORD GLOBAL TECHNOLOGIES, LLC, Dearborn, MI (US)

(72) Inventors: Keith Weston, Canton, MI (US); James Ethan Jones, Westland, MI (US); Andrew Thomas Cunningham, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 15/723,725

(22) Filed: Oct. 3, 2017

(65) Prior Publication Data
US 2019/0100077 A1    Apr. 4, 2019

(51) Int. Cl.
*B60H 1/00* (2006.01)
*B60Q 9/00* (2006.01)

(52) U.S. Cl.
CPC ......... *B60H 1/00821* (2013.01); *B60H 1/008* (2013.01); *B60H 1/00849* (2013.01); *B60Q 9/00* (2013.01)

(58) Field of Classification Search
CPC ............ B60H 1/00821; B60H 1/00849; B60H 1/008; B60Q 9/00
See application file for complete search history.

(56) References Cited

U.S. PATENT DOCUMENTS

| | | | |
|---|---|---|---|
| 4,482,092 A | 11/1984 | Biber et al. | |
| 5,450,894 A * | 9/1995 | Inoue | B60H 1/00285 165/43 |
| 2009/0150090 A1 * | 6/2009 | Brodsky | B60H 1/008 702/31 |
| 2013/0327891 A1 * | 12/2013 | Zhang | B64D 13/08 244/118.5 |
| 2017/0272338 A1 * | 9/2017 | Borrel | H04L 67/18 |
| 2018/0202824 A1 * | 7/2018 | Borrel | G01C 21/32 |
| 2018/0334013 A1 * | 11/2018 | Koravadi | B60H 1/00849 |

FOREIGN PATENT DOCUMENTS

| | | |
|---|---|---|
| DE | 19604661 A1 | 8/1997 |
| EP | 1225070 A2 | 7/2002 |
| EP | 1422089 A2 | 5/2004 |
| JP | 2009223514 A | 10/2009 |
| WO | 2007031525 A1 | 3/2007 |

OTHER PUBLICATIONS

English Machine Translation of DE19604661A1.
English Machine Translation of EP1225070A2.
English Machine Translation of EP1422089A2.
English Machine Translation of JP2009223514A.
English Machine Translation of WO2007031525A1.

* cited by examiner

*Primary Examiner* — Mussa A Shaawat
(74) *Attorney, Agent, or Firm* — David Coppiellie; King & Schickli, PLLC

(57) ABSTRACT

A tire smoke induction prevention system for a motor vehicle includes a tire smoke condition feature and a controller. The tire smoke condition feature may be adapted to produce a warning signal when potential for tire smoke generation exceeds a predetermined level or likelihood. The controller is adapted to respond to such a warning signal and engage a climate control system of the motor vehicle in recirculation mode. A related method for preventing the induction of tire smoke into a passenger cabin of a motor vehicle is also provided.

20 Claims, 2 Drawing Sheets

TIRE SMOKE INDUCTION PREVENTION SYSTEM FOR A MOTOR VEHICLE

TECHNICAL FIELD

This document relates generally to the motor vehicle equipment field and, more particularly, to a system adapted to prevent the induction of tire smoke into the passenger cabin of the motor vehicle when operating conditions or driving maneuvers have a tendency to produce tire smoke from wheel spin.

BACKGROUND

During certain driving maneuvers and under certain operating conditions, the driven wheels of a motor vehicle produce substantial wheel spin which has a tendency to generate tire smoke. For example, line-lock operation, burnouts, drifting and spinning may produce sufficient tire smoke to engulf a motor vehicle in a tire smoke cloud. That tire smoke has a tendency to be inducted into the passenger cabin of the motor vehicle and/or the storage compartment of the motor vehicle through the fresh air induction door of the heating, ventilating and air conditioning (HVAC) system and/or the extractor door of the air extractor. The resulting tire smoke residue may settle on the various surfaces of the interior of the motor vehicle including, for example, the instrument panel, the center console, the seats and even along the surface of the headliner. Further, some tire smoke residue may coat the internal surfaces of the HVAC system ducts where it cannot be readily cleaned from the surface and may produce an odor over time through discharge from the ducts when operating the HVAC system.

This document relates to a tire smoke induction prevention system for a motor vehicle that reduces and substantially eliminates the induction of tire smoke into the passenger compartment and the storage compartment of the motor vehicle.

SUMMARY

In accordance with the purposes and benefits described herein, a new and improved tire smoke induction prevention system is provided for a motor vehicle. That tire smoke induction prevention system comprises (a) a tire smoke condition feature monitoring the potential for tire smoke generation and (b) a controller that is adapted to respond to that tire smoke condition feature and engage a climate control system of the motor vehicle in recirculation mode. In at least one possible embodiment, the tire smoke condition feature produces a warning signal and the controller responds to that warning signal.

For purposes of this document, the terminology "tire smoke condition feature" means any device or controller associated with a driving mode or driving condition of the motor vehicle that could produce tire smoke as well as to any sensor adapted for detecting or monitoring tire smoke or tire smoke production.

In some embodiments, the tire smoke condition feature may comprise a tire smoke sensor. In some embodiments, the tire smoke condition feature may comprise a drive mode control device.

The tire smoke condition feature may comprise a line-lock actuator. For purposes of this document a "line-lock actuator" is a button, switch or other switching device adapted to allow a driver of a motor vehicle to engage the front wheel brakes and have the motor vehicle hold the line while spinning the rear tires in a burnout.

The tire smoke condition feature may also comprise a drift mode actuator. For purposes of this document, a "drift mode actuator" is a button, switch or other switching device adapted to allow a driver of a motor vehicle to spin the tires and drift the motor vehicle around a corner. Further, the tire smoke condition feature may comprise a simple actuator allowing the operator to engage the operation of the tire smoke induction prevention system at any time desired by simply manipulating the actuator.

The tire smoke condition feature may detect any "Excessive Tire Smoke Situation" such as, but not necessarily limited to line-lock, launch control, drift mode engaged (excessive yaw detected), rear wheel speed higher than front wheel speed, and brakes locked up while vehicle is moving. The tire smoke condition feature may use relative wheel speed comparisons between driven and non-driven wheels to determine spin or slip. Further, the tire smoke condition feature may use yaw rate error (understeer or oversteer detection) to determine wheel spin or slip.

The tire smoke condition feature may also compare engine torque and/or wheel speed to vehicle acceleration to determine a rate of acceleration less than that which would be associated with a 'zero wheel slip' condition to infer the tires slipping.

Where the motor vehicle includes an HVAC or climate control system, the tire smoke induction prevention system may further include a fresh air induction door for the HVAC or climate control system and a door actuator for displacing the fresh air induction door to a first closed position.

Still further, the tire smoke induction prevention system may further include an air extractor door and an extractor door actuator for displacing the air extractor door to a second closed position. Thus, when the tire smoke induction prevention system is activated, the door actuator may close the fresh air induction door and the extractor door actuator may close the air extractor door so as to prevent induction of tire smoke into the passenger cabin and storage compartment or trunk of the motor vehicle.

In accordance with an additional aspect, a method for preventing induction of tire smoke into a passenger cabin of a motor vehicle is provided. That method comprises the steps of producing, by a tire smoke condition feature, a warning signal when potential for tire smoke generation exceeds a predetermined level and engaging, by a controller, a climate control system of the motor vehicle in recirculation mode in response to the warning signal.

Still further, the method may include the step of generating the warning signal by tire smoke sensor. The method may further include the step of generating the warning signal by drive mode control device. The method may include the step of generating the warning signal by line-lock actuator. The method may include generating the warning signal by drift mode actuator.

Further, the method may include the step of displacing, by the controller, a fresh air induction door into a closed position. In addition, the method may include the step of displacing an extractor door into a closed position.

In the following description, there are shown and described several preferred embodiments of the tire smoke induction prevention system and the related method for preventing induction of tire smoke into a passenger cabin of a motor vehicle. As it should be realized, the tire smoke induction prevention system and related method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tire smoke induction prevention system and related method of preventing induction of tire smoke into a passenger cabin of a motor vehicle and together with the description serve to explain certain principles thereof.

Reference will now be made in detail to the present preferred embodiments of the tire smoke induction prevention system and the method of preventing induction of tire smoke into a passenger cabin of a motor vehicle, examples of which are illustrated in the accompanying drawing figures.

DETAILED DESCRIPTION

Figure 1:
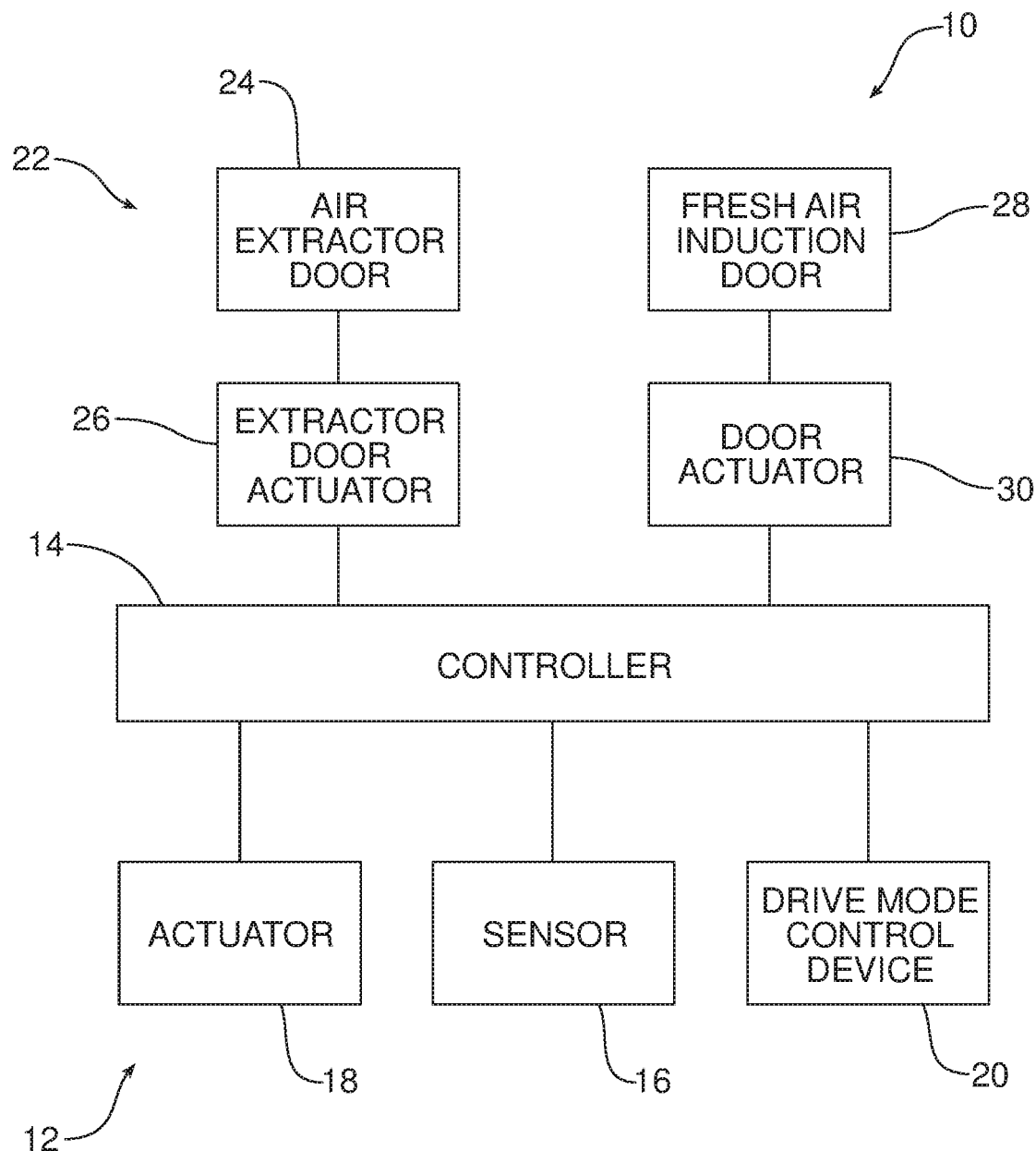
FIG. 1 is a schematic block diagram of the tire smoke induction prevention system.

Reference is now made to FIG. 1 schematically illustrating the new and improved tire smoke induction prevention system 10 adapted to prevent the induction of tire smoke into the passenger cabin and storage compartment or trunk of a motor vehicle. As illustrated in FIG. 1, the tire smoke induction prevention system 10 includes a tire smoke condition feature, generally designated by reference numeral 12, that monitors the potential for tire smoke generation. In at least one possible embodiment, the tire smoke generation feature 12 produces a warning signal when potential for tire smoke generation exceeds a predetermined level. In addition, the tire smoke induction prevention system 10 includes a controller 14 adapted to respond to tire smoke generation feature 12. In at least one possible embodiment, the controller 14 is adapted to respond to the warning signal from the tire smoke condition feature 12 and engage an HVAC or climate control system (not illustrated) of the motor vehicle in recirculation mode. In recirculation mode, interior passenger compartment air is recirculated through the passenger compartment and the introduction or induction of fresh air into the passenger compartment is prevented in a manner described in greater detail below.

The controller 14 may comprise a computing device such as a dedicated microprocessor or an electronic control unit (ECU) operating in accordance with instructions from appropriate control software. The controller 14 may comprise one or more processors, one or more memories, and one or more network interfaces. As should be appreciated, all of these processors, memories and network interfaces may communicate with each other over a communication bus.

As illustrated in FIG. 1, the tire smoke condition feature 12 may comprise one or more of the following: (a) a sensor 16 such as a tire smoke sensor, (b) an actuator 18, such as a line-lock actuator, a drift mode actuator or a simple tire smoke condition feature actuator allowing one to activate the tire smoke induction prevention system any time at will, and (c) a drive mode control device 20 such as a power-train control module (PCM) of a type that may be provided to allow a motor vehicle operator to select motor vehicle operation in drift mode. Such a PCM is found on the 2017 model year Ford Focus RS.

As further illustrated in FIG. 1, the tire smoke induction prevention system 10 may also include an air extractor 22, including an air extractor door 24 and an extractor door actuator 26 for closing the air extractor door 24. As is known in the art, such an air extractor 22 allows for the equalization of air pressure inside the passenger compartment with the ambient environment and is used to prevent wind throb when driving the motor vehicle with the windows open and/or to reduce the effort when closing the doors of the motor vehicle when the windows are closed.

As also illustrated in FIG. 1, the tire smoke induction prevention system 10 may also include a fresh air induction door 28, to allow the HVAC or climate control system to induct fresh air into the passenger cabin of the motor vehicle, and a door actuator 30 for overriding the HVAC or climate control system setting for the fresh air induction door 28 and closing that door to prevent induction of tire smoke into the HVAC ducts and passenger cabin of the motor vehicle.

The tire smoke induction prevention system 10 may be utilized in a method for preventing induction of tire smoke into a passenger cabin of a motor vehicle. That method may comprise the steps of (a) producing, by a tire smoke condition feature 12, a warning signal when the potential for tire smoke generation exceeds a predetermined level or likelihood and (b) engaging, by the controller 14, a climate control system of the motor vehicle in recirculation mode in response to the warning signal.

More particularly, the method may include the step of generating that warning signal by a tire smoke sensor 16. The method may include generating that warning signal by a drive mode control device 20. The method may include generating that warning signal by means of an actuator 18. That actuator may take the form of, for example, a line-lock actuator, a drift mode actuator or a simple on-off system actuator allowing the operator to activate the tire smoke induction prevention system at any desired time. When activated, the tire smoke induction prevention system 10 closes the fresh air induction door 28 preventing the induction of fresh air and tire smoke into the passenger cabin of the motor vehicle through the HVAC or climate control system. Further, the tire smoke induction prevention system 10 closes the air extractor door 24 to prevent air and tire smoke from being drawn into the storage compartment of the motor vehicle.

Thus, it should be appreciated that the method may be further described as including the step of displacing, by the controller 14 and the door actuator 30, the fresh air induction door 28 into a closed position. In addition the method may include the step of displacing the extractor door 24, by the controller 14 and extractor door actuator 26 into a closed position.

The method may also include the step of determining actual wheel slip and comparing, by the controller 14, the actual wheel slip to a predetermined threshold wheel slip value. If the actual wheel slip exceeds the predetermined threshold value, the fresh air induction door 28 and the extractor door 24 are closed.

Actual wheel slip may be determined in a number of ways. For example, the method may include the step of comparing, by the controller 14, driven wheel speed to non-driven wheel speed to determine wheel slip. In another example, the method may include the step of using yaw rate error: that is, understeer or oversteer detection to determine wheel slip. In yet another example, the method may include the step of comparing, by the controller 14, engine torque alone, wheel speed alone or engine torque and wheel speed together to determine a rate of acceleration where that rate of acceleration is less than that which would be associated with a zero wheel slip condition, wheel slip is inferred.

Figure 2:
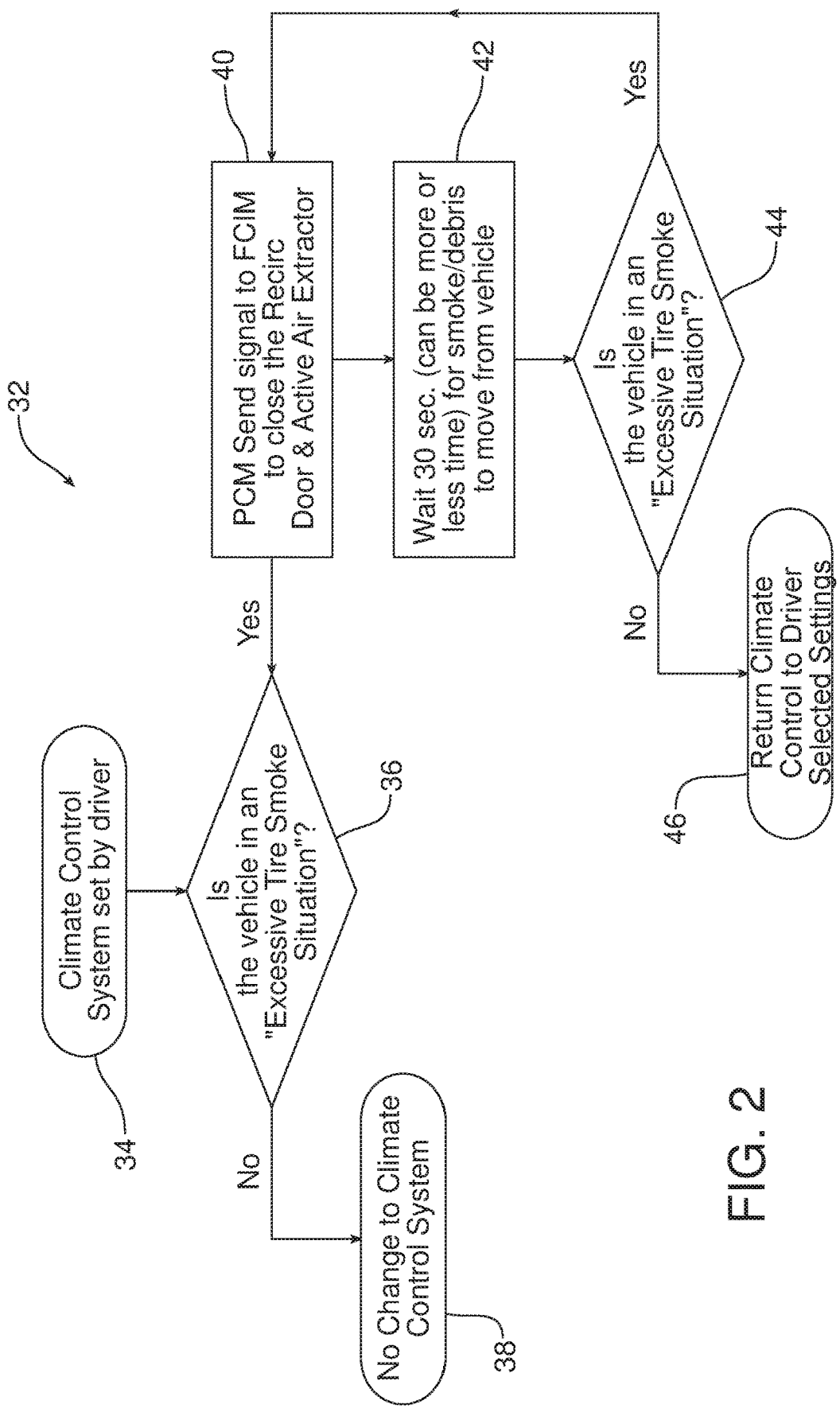
FIG. 2 is one possible control logic flow diagram for the tire smoke induction prevention system illustrated in FIG. 1.

FIG. 2 illustrates one possible embodiment of control logic flow diagram 32 for the tire smoke induction prevention system 10. The control logic flow diagram 32 is self-explanatory. The driver or motor vehicle operator sets the climate control system at box 34. At box 36, the controller 14 queries whether the motor vehicle is in an excessive tire smoke situation: that is whether the potential for the generation of tire smoke exceeds a predetermined level or likelihood. If the tire smoke condition feature 12 produces no warning signal, no change is made to the climate control system at box 38. In contrast, where the tire smoke condition feature 12 produces a warning signal, the controller 14 may send a signal to the door actuator 30 to close the fresh air induction door 28 of the HVAC or climate control system. In the embodiment illustrated in FIG. 2, the power train control module (PCM) sends a signal to the front control interface module (FCIM): (a) to close the fresh air induction door 28 and exclusively provide for recirculation of air through the climate control system and (b) close the active air extractor 24 at box 40. The controller 14 then waits for a predetermined period of time such as 30 seconds (see box 42) before again querying whether the motor vehicle is in an excessive tire smoke situation wherein the potential for tire smoke generation exceeds a predetermined level (see box 44). If no warning signal is received from the smoke condition feature 12, no change signal is sent to the climate control system and, therefore, the climate control system operates absent the override from the tire smoke induction prevention system 10 and the fresh air induction door 28 may be opened if required by the climate control system settings (see box 46). In other words, the climate control is returned to the driver selected settings. However, if the smoke condition feature 12 produces a warning signal, operation returns to box 40 and the air extractor door 24 and fresh air induction door 28 remain closed.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A tire smoke induction prevention system for a motor vehicle, comprising:
   a tire smoke condition feature monitoring potential for tire smoke generation; and
   a controller adapted to respond to said tire smoke condition feature and engage a climate control system of said motor vehicle in recirculation mode.
2. The tire smoke induction prevention system of claim 1, wherein said tire smoke condition feature is a tire smoke sensor.
3. The tire smoke induction prevention system of claim 1, wherein said tire smoke condition feature is a drive mode control device.
4. The tire smoke induction prevention system of claim 1, wherein said tire smoke condition feature is a line-lock actuator.
5. The tire smoke induction prevention system of claim 1, wherein said tire smoke condition feature is a drift mode actuator.
6. The tire smoke induction prevention system of claim 1, wherein said tire smoke condition feature is an actuator.
7. The tire smoke induction prevention system of claim 1, further including a fresh air induction door and a door actuator for displacing said fresh air induction door to a first closed position.
8. The tire smoke induction prevention system of claim 7, further including an air extractor door and an extractor door actuator for displacing said air extractor door to a second closed position.
9. The tire smoke induction prevention system of claim 1, further including an air extractor door and an extractor door actuator for displacing said air extractor door to a second closed position.
10. A method for preventing induction of tire smoke into a passenger cabin of a motor vehicle, comprising:
    producing, by tire smoke condition feature, a warning signal when potential for tire smoke generation exceeds a predetermined level; and
    engaging, by controller, a climate control system of said motor vehicle in recirculation mode in response to said warning signal.
11. The method of claim 10, including generating said warning signal by tire smoke sensor.
12. The method of claim 10, including generating said warning signal by drive mode control device.
13. The method of claim 10, including generating said warning signal by line-lock actuator.
14. The method of claim 10, including generating said warning signal by drift mode actuator.
15. The method of claim 10, including displacing, by said controller, a fresh air induction door into a closed position.
16. The method of claim 15, including displacing, by said controller, an extractor door into a closed position.
17. The method of claim 10, including determining actual wheel slip and comparing, by said controller, said actual wheel slip to a predetermined threshold wheel slip value.
18. The method of claim 17, including comparing driven wheel speed to non-driven wheel speed to determine wheel slip.
19. The method of claim 17, including using yaw rate error to determine wheel slip.
20. The method of claim 17, including comparing, by said controller, engine torque and/or wheel speed to actual vehicle acceleration to determine a rate of acceleration less than that which would be associated with a zero wheel slip condition to infer wheel slip.

* * * * *